(12) United States Patent
Karve

(10) Patent No.: US 12,403,963 B2
(45) Date of Patent: Sep. 2, 2025

(54) BODY MOUNTED AIR BRAKES FOR STABILITY AND STEERING IN LOW MU CONDITIONS IN AUTONOMOUS VEHICLES AND METHOD OF USING THE SAME

(71) Applicant: Continental Automotive Systems, Inc., Auburn Hills, MI (US)

(72) Inventor: Omkar Karve, Farmington Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 273 days.

(21) Appl. No.: 17/868,992

(22) Filed: Jul. 20, 2022

(65) Prior Publication Data

US 2024/0025494 A1    Jan. 25, 2024

(51) Int. Cl.
*B62D 37/02*    (2006.01)

(52) U.S. Cl.
CPC ................................... *B62D 37/02* (2013.01)

(58) Field of Classification Search
CPC .... B62D 37/02; B62D 35/005; B62D 35/007; B62D 35/008; B62D 35/00; B62D 35/02; B60T 1/16
See application file for complete search history.

(56) References Cited

U.S. PATENT DOCUMENTS

| | | | |
|---|---|---|---|
| 7,367,530 B2 * | 5/2008 | Harrigan | B64C 9/34 244/184 |
| 11,498,658 B2 * | 11/2022 | Thomas | B64C 9/02 |
| 2020/0238999 A1 * | 7/2020 | Batts | B60W 30/09 |
| 2023/0150462 A1 * | 5/2023 | Karve | B60T 8/171 701/70 |
| 2024/0101132 A1 * | 3/2024 | Sostaric et al. | B60W 50/0098 |

FOREIGN PATENT DOCUMENTS

| | | | |
|---|---|---|---|
| DE | 102011102493 A1 | 3/2012 | |
| DE | 102017116387 A1 | 1/2018 | |
| DE | 102017004964 A1 | 11/2018 | |
| DE | 102018119359 A1 | 2/2019 | |
| DE | 102019104739 A1 | 8/2019 | |
| DE | 102019112446 A1 | 11/2019 | |
| DE | 102021103640 A1 | 8/2021 | |
| DE | 112020000542 T5 | 11/2021 | |
| WO | WO-2016020423 A1 * | 2/2016 | B62D 37/02 |

OTHER PUBLICATIONS

Office Action dated Dec. 18, 2024 from corresponding German patent application No. 10 2022 129 933.3.

* cited by examiner

*Primary Examiner* — Scott A Browne
*Assistant Examiner* — Lidia Kwiatkowska

(57) ABSTRACT

A number of variations may include a product including a body mounted air brake stabilizing and steering a vehicle having autonomous driving capabilities or functions, and a method of using the same, wherein the air brake is power actuated.

10 Claims, 4 Drawing Sheets

BODY MOUNTED AIR BRAKES FOR STABILITY AND STEERING IN LOW MU CONDITIONS IN AUTONOMOUS VEHICLES AND METHOD OF USING THE SAME

TECHNICAL FIELD

The field to which the disclosure generally relates to includes air brakes and air foils, and method of using the same in vehicle with autonomous driving capabilities.

BACKGROUND

Vehicles typically include steering systems, including electric power steering systems, and brakes applied to vehicle wheels.

SUMMARY OF ILLUSTRATIVE VARIATIONS

A number of variations may include a product including a body mounted air brake for stabilizing and steering a vehicle having autonomous driving capabilities or functions, wherein the air brake is power actuated.

A number of variations a pair of body mounted air brakes are symmetrically mounted to one or more body panels for stabilizing and steering a vehicle having autonomous driving capabilities or functions, wherein the air brakes are power actuated.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
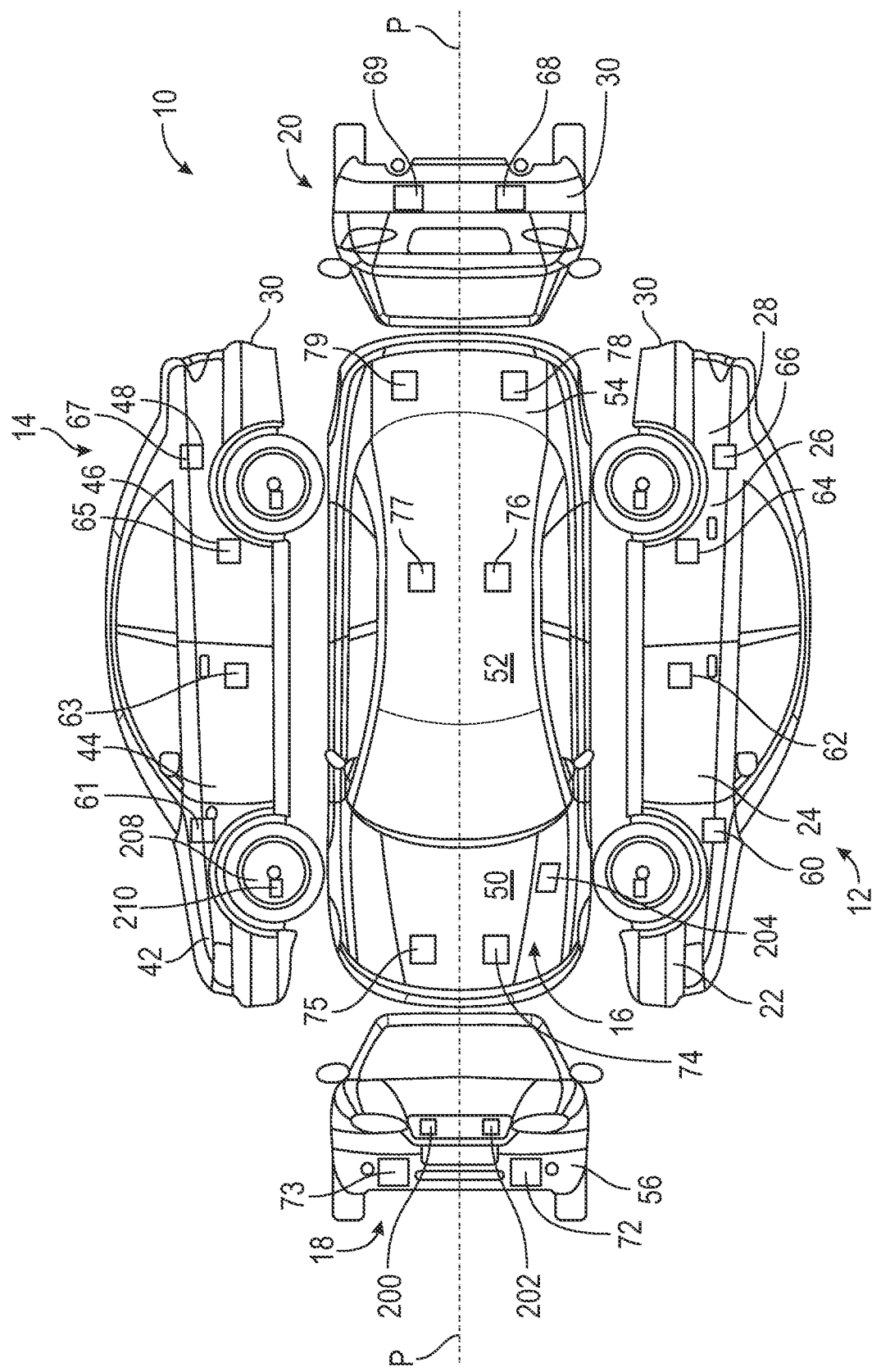
FIG. 1 is a schematic illustration of a number of variations including a vehicle having a plurality of body mounted air brakes.

A number of variations are illustrated in FIG. 1 which illustrates a vehicle 10 from a top position with the driver side 12, passenger side 14, front-end 18, and rear-end 20 illustrated in flattened positions as is the top 16 of the vehicle 10. An imaginary vertical, central, longitudinal (running lengthwise of the vehicle) plane P is illustrated and FIG. 1. In a number of variations, pairs of body mounted power actuated air brakes (described in more detail hereafter) are provided on a vehicle and separated by an imaginary vertical, central plane P running lengthwise the vehicle. Such an arrangement allows for the activation of opposing air brakes to be used to stabilize and steer the vehicle, which is constructed and arranged to have autonomous driving capabilities or functions.

The driver side 12 may include a front quarter panel 22, an adjacent driver side front door panel 24, a driver side rear door 26, a driver side rear quarter panel 28. The passenger side 14 may include a passenger side front quarter panel 42, an adjacent passenger side front side door 44, adjacent rear passenger side door 46, and a passenger side rear quarter panel 48. The top of the vehicle may have several body panels including a hood 50, a roof 52, and a trunk or rear decklid 54. The front-end 18 of the vehicle may include a front body panel 56, which may be a front fascia. The rear-end 20 may include a rear body panel 30, which may be a rear fascia.

A driver side front quarter panel air brake 61 may be connected to the driver side front quarter panel 22 on a first side of imaginary plane P. On the opposite side of imaginary plane P, a passenger side front quarter panel air brake 61 may be connected to the passenger side front quarter panel 42. A driver side front door brake 62 may be connected to the driver side front door on a first side of imaginary plane P. On the opposite side of the imaginary plane P, a passenger side front door air brake 63 may be connected to the passenger side front door 44. A driver side rear door air brake 64 may be connected to the driver side rear door 26 on a first side of imaginary plane P. On the opposite side of imaginary plane P, a passenger side rear door air brake 65 may be connected to the passenger side rear door 46. A driver side rear quarter panel air brake 66 may be connected to the driver side rear quarter panel 28 on a first side of imaginary plane P. On the opposite side of imaginary plane P, a passenger side rear quarter panel air brake 67 may be connected to the passenger side rear quarter panel 48. A first hood brake 74 may be connected to the hood 50 on a first side of imaginary plane P. On the opposite side of the imaginary plane P, a second hood air brake 75 may be connected to the hood 50. A first roof air brake 76 may be connected to the roof 52 on a first side of imaginary plane P. On the opposite side of imaginary plane P, a second roof air brake 77 may be connected to the roof 52. A first trunk decklid air brake 78 may be connected to the trunk lid 54 on a first side of imaginary plane P. On the opposite side of imaginary plane P, a second air trunk decklid brake 79 may be connected to the trunk lid 54. A first front-end air brake 72 may be connected to the front-end body panel 56. On the opposite side of imaginary plane P, a second front-end air brake 73 may be connected to the front-end body panel 56. A first rear-end air brake 68 may be connected to the rear-end body panel on a first side of imaginary plane P. On the opposite side of imaginary plane P, a second rear-end air brake 69 may be connected to the rear-end body panel 30. The pair of power actuated air brakes may be symmetrically positioned with respect to the imaginary vertical, central plane P running lengthwise the vehicle.

The air brakes may be selectively actuated on one side of the vehicle or the other to increase aerodynamic drag on a side of the vehicle to stabilize the vehicle or steer the vehicle. The use of air brakes to stabilize or steer the vehicle may be helpful in situations the coefficient of friction MU of the driving surface is relatively low. Examples of low coefficient of friction driving situations include when there is ice, snow, standing water, gravel, sand, dirt or loose asphalt or other materials on the driving surface which reduce tire traction compared to a dry, clean driving surface. A numerical value for a low coefficient of friction driving surface maybe determined by a system that tracks vehicle stability using traditional methods such as ABS/ESP and/or wheel slip/steering system loads. The low mu number might not necessarily cause activation of the air brake system. The air brakes are more likely to be deployed when traditional stability systems such as ABS/ESP or steering systems begin to not have sufficient lateral loads on the vehicle and vehicle continues to be unstable even after traditional systems have activated.

A number of variations include a method of using least one sensor 200 and a computer system 204 connected thereto to estimate a coefficient of friction of a vehicle driving surface and activating one or more air brakes connected to a body of the vehicle if the estimated coefficient of friction is below a predetermined level.

A number of variations may include a method of using an optical recognition device such as, but not limited to at least one camera 202, and a computer system 204 to determine if a driving surface has at least one of ice, snow, standing water, gravel, sand, dirt, or loose asphalt on the driving surface, and if so activating one or more air brakes connected to a body of the vehicle.

In a number of variations, the activation of at least one air brake connected to a body of the vehicle is performed instead of applying a brake 210 connected to a wheel 208 of the vehicle. In a number of variations, the activation of at least one air brake connected to a body of the vehicle is performed in addition to applying a brake 210 connected to a wheel 208 of a vehicle.

A number of variations may include a product or system including a vehicle having at least one sensor of optical recognition device, at least one power actuated (actuatable) air brake mounted on a panel of the vehicle, at least one processor, memory, and instructions stored in the memory and executable by the processor to receive input from the at least one sensor of optical recognition device, use the input received from the at least one sensor of optical recognition device to estimate a coefficient of friction of the driving surface on which the vehicle is travelling and determent that the estimated coefficient of friction is below a predetermined value or to recognize the presence a material including at least one of ice, snow, standing water, gravel, sand, dirt, or loose asphalt on the driving surface on which the vehicle is traveling, activate the at least one power actuated air brake in response to the determination that the estimated coefficient of friction is below the predetermined value or the recognition of the presence of the material to stabilized or steer the vehicle. In a number of variations, the product or system may include at least one vehicle dynamics sensor and wherein the instructions executable by the processor cause the product or system to receive input from the at least one vehicle dynamics sensor and determine the pitch, roll, or yaw of the vehicle, and to activate, deactivate or adjust the position power actuated air brake and the drag aerodynamic drag caused the vehicle by the power actuated air brake in response to the determined pitch, roll, or yaw of the vehicle.

A number of variations may include a method in a vehicle having at least one sensor of optical recognition device, at least one power actuated air brake mounted on a panel of the vehicle, at least one processor, memory, and instructions stored in the memory and executable by the processor, the method including the processor receiving input from the at least one sensor of optical recognition device, using the input received from the at least one sensor of optical recognition device to estimate a coefficient of friction of the driving surface on which the vehicle is travelling and determent that the estimated coefficient of friction is below a predetermined value or to recognize the presence a material including at least one of ice, snow, standing water, gravel, sand, dirt, or loose asphalt on the driving surface on which the vehicle is traveling, activating the at least one power actuatable air brake in response to the determination that the estimated coefficient of friction is below the predetermined value or the recognition of the presence of the material to stabilized or steer the vehicle. In a number of variations, the vehicle may include at least one vehicle dynamics sensor, and the method including the processor receiving input from the at least one vehicle dynamics sensor and determining the pitch, roll, or yaw of the vehicle, and activating, deactivating, or adjusting the position of the air brake and the drag aerodynamic drag caused on the vehicle by the air brake in response to the determined pitch, roll, or yaw of the vehicle.

Figure 2:
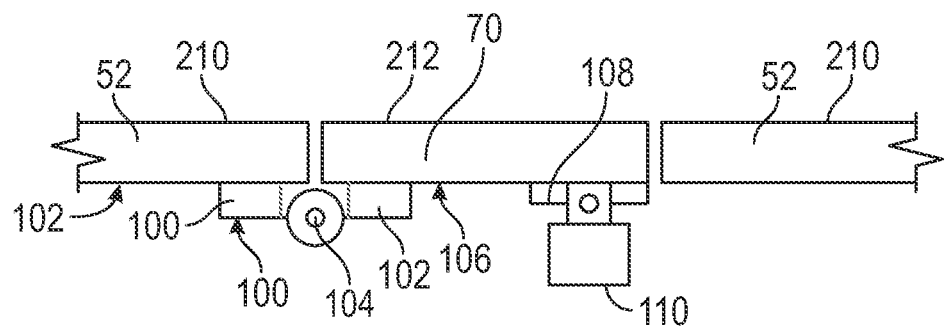
FIG. 2 is a schematic illustration of a body mounted air brake including a hinge mounting and an actuator where in the air brake is flush with the surrounding body panel.
Figure 3:
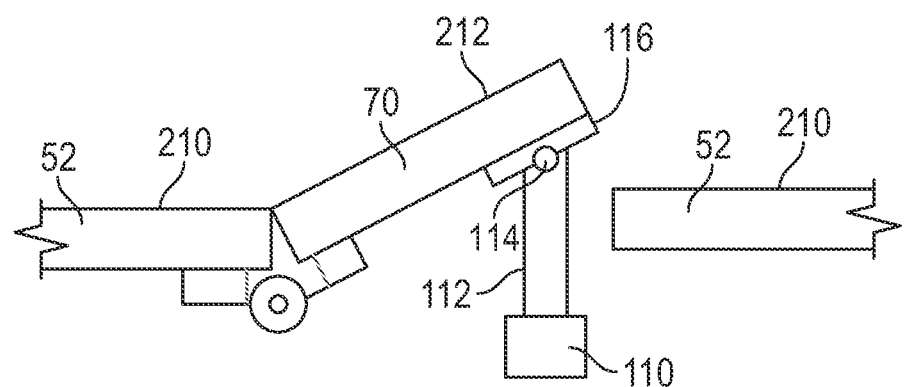
FIG. 3 is a schematic illustration of the body mounted air brake of FIG. 2 in an activated position.

Referring to FIG. 2, an air brake 70 may be mounted to a body panel 52, for example, with a hinge 100 having a first plate 100 attached to the body panel 52 and a second plate 102 attached to the air brake 70 in a pin 104 extending through interdigitated portions of the first plate 100 and the second plate 102. An actuator 110 may be pivotally connected to a portion of the air brake 70. In a first position a top surface 210 of the body panel 52 is flush with a top surface 212 of the air brake 70. The air brake 70 may be moved to a second position (shown in FIG. 3) wherein at least a portion of the top surface 212 thereof is displaced a distance from the top surface 210 of the body panel 52 so that the air brake 70 creates aerodynamic drag on the vehicle stabilizing the vehicle or steering the vehicle independently or in combination with the steering system or a wheel brake system. The air brake 70 may be moved to the second position by a telescoping shaft 112 of the actuator 110. The air brake may be operated or moved mechanically, electro-mechanically, hydraulically, electrically, pneumatically, or any other means. In one variation, the air brake may be actuated by a bladder attached to the air brake which may be inflated and deflated. However, for fast movement between the first and second positions of the air brake, the air brake may be actuated by a mechanical stepper motor or a spring biased solenoid.

Figure 4:
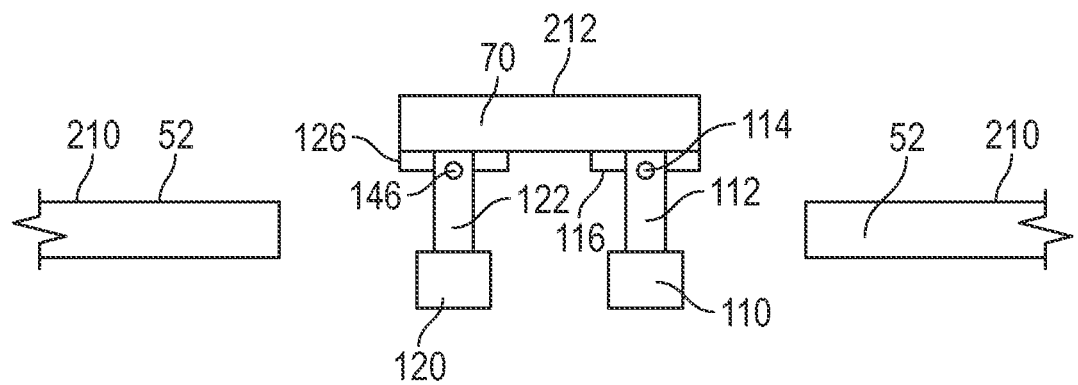
FIG. 4 is an Is this schematic illustration of an air brake having two actuators.

Referring now to FIG. 4, and a number of variations at least two actuators 110, 112 may be attached pivotally to the air brake 70, for example, using a telescoping shaft 112 of the actuator 120, 110.

Figure 5:
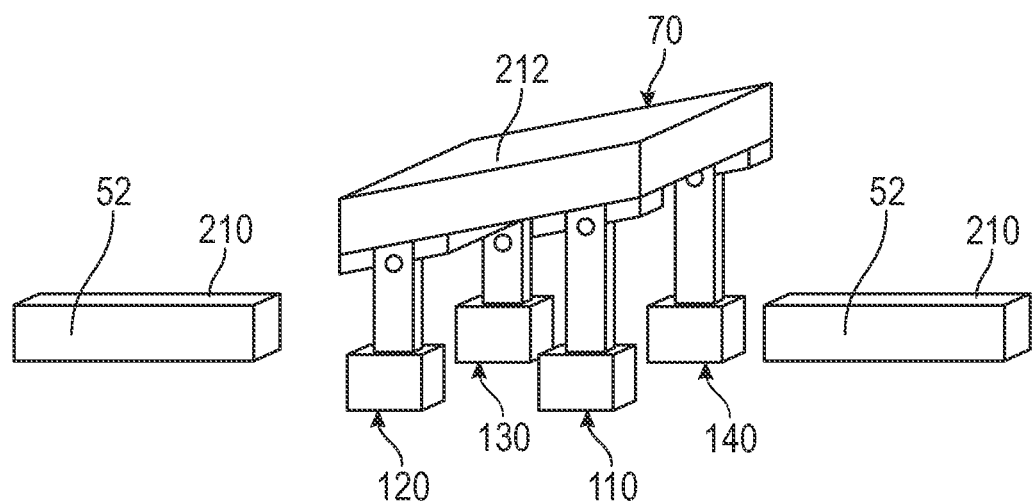
FIG. 5 is as a schematic illustration of an air brake having four actuators.

Referring now to FIG. 5, in a number of variations four actuators 110, 120, 130, 140 may be pivotally connected to the air brake 70 near corners thereof. Such a construction would allow a single air brake to be mounted on a body panel (portion of the vehicle) 52 so that the top surface 112 of the air brake 70 maybe tilted in the X, Y and Z directions, for example, in a first position to create aerodynamic drag causing the vehicle to steer to the left, and in a second position causing the vehicle to steer to the right. In both the first and second positions, every point on the top surface 112 of the air brake 70 may be displaced a distance from the top surface to 210 of the body panel 52.

Figure 6:
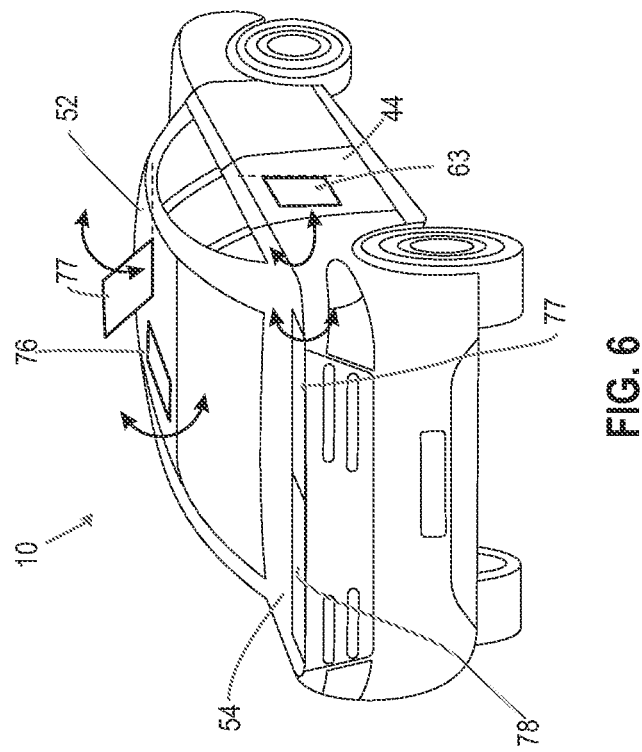
FIG. 6 is a perspective view of a vehicle including a plurality of air brakes mounted in various positions including on the roof, rear decklid, and passenger door of a vehicle.

FIG. 6 is a perspective view of a vehicle including a plurality of air brakes mounted in various positions including on the roof, truck decklid, and passenger door of a vehicle.

Figure 7:
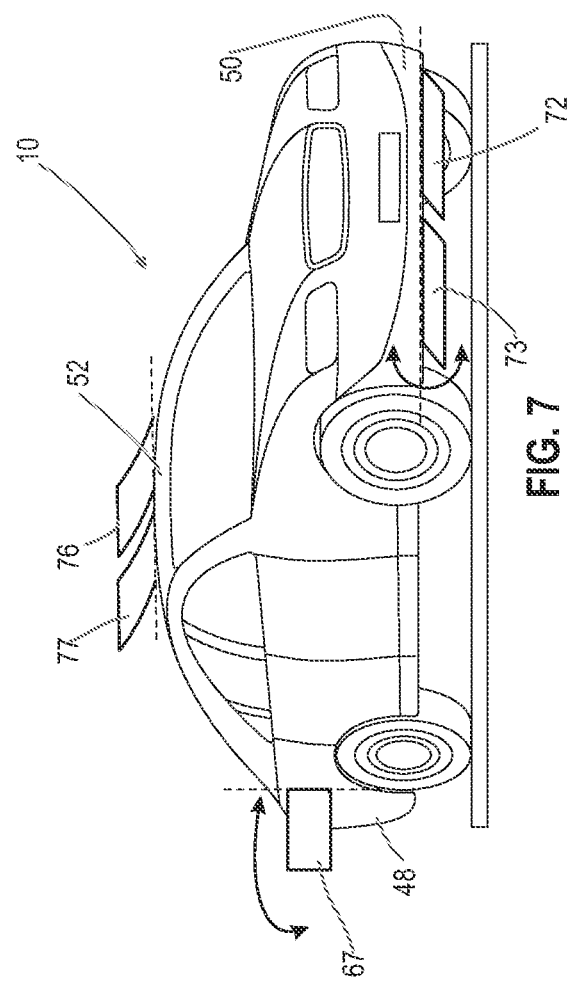
FIG. 7 is a perspective view of a vehicle including a plurality of air brakes mounted in various positions including and the roof, rear quarter panel, and front body panel.

FIG. 7 is a perspective view of a vehicle including a plurality of air brakes mounted in various positions including and the roof, rear quarter panel, and front body panel.

In low mu situations torque provided by steering system and brakes is compromised thereby limiting a vehicle motion control systems ability to follow a path.

In low mu conditions torque available from steering system and brakes to enable effective vehicle stability management is compromised. This also compromises an autonomous vehicle motion control system's ability to keep to a prescribed path. A number of variations may include use of integrate active air brake and its control into a vehicle motion control system to provide additional moment to enable better control at high speeds in low mu condition.

The air brakes can be installed as various locations of a given vehicle (front bumper, rear bumper, roof etc.). air brakes may be actuated or driven by linear DC motors with fine control over its linear position. An autonomous motion control system of the vehicle may take into account various parameters such as mu, lateral acceleration and wheel slip to activate the appropriate air brake by sending a linear motion command to the linear motor connected to an air brake. This will in turn add to the required corrective moment to bring the vehicle yaw in check in conjunction with the ESP system or independent of the (ESP) system depending on the system design. The control of the various air brake angles may be driven by the motion control system.

The basic operation of the air brake may be simple. The air brake offers resistance to the flow of air over it proportional to the angle of attack, area of the spoiler and speed of the vehicle.

This use of air brakes offers an additional method of offering a corrective moment to correct the vehicle yaw in conditions of low mu where the vehicle is beginning to lose control. In some circumstances, the air brakes in conjunction with a vehicle motion control system may even be used to completely correct the out of control vehicle (at high speeds) where the vehicle has lost complete traction force with the road surface.

In a number of variations, an active multiple air brake system is available to be deployed when needed on a vehicle. This system can be a post-production implementation or be an integral part of the vehicle design. A vehicle motion system may have full control of the activation linear motors that control the angles of the ai brake surfaces. This system is not meant to replace the standard brake system based ESP but is meant to augment and/or assist it to better control the vehicle in extreme situations such as very low mu surfaces. This system can also assist the ESP system to better control the vehicle as a secondary redundant system at high speeds. Having this system available will provide a broader control bandwidth to a motion control system (MCS). This system can be offered on high end vehicles as they will have a higher chance of already having an integrated active spoiler system. In a number of variations, integration of the active air brake control with the autonomous MCS in order to achieve better yaw control in low mu situations and also in normal conditions, if so warranted.

There are a number of ways to estimate the coefficient of friction of a driving surface on which a vehicle is travelling. One way is disclosed in U.S. patent application Ser. No. 17/528,115, filed Nov. 16, 2021, portions of which are repeated hereafter. As used herein, the term "approximate" and variations on that term indicate that measurements, positions, timing, or the like allows for some imprecision in a value i.e., with some variation in exactness in a value; about or reasonably close to a value; or nearly. If, for some reason, the imprecision provided by "approximate" is not otherwise understood in the art with this ordinary meaning, then "approximate" as used herein indicates at least variations that may arise from ordinary methods of measuring or using such parameters.

As used herein, "wheels" or "wheel," even when modified by a descriptive adjective such as but not limited to in the recitation of "steerable roadwheels," "steerable wheels," "road wheels," or "driven wheels," may refer to a traditional road wheel and tire arrangement, but may also refer to any modification to the traditional road wheel and tire arrangement such as but not limited to rimless mag-lev tires, ball tires, or any other known means of automotive movement wherein the wheel or wheels are in at least partial contact with a road surface.

As used herein, "road," even when modified by a descriptive adjective may refer to a traditional driving surface road such as but not limited to a concrete or asphalt road but may also refer to any driving surface or medium along which or through which a vehicle for cargo or passengers may travel such as but not limited to water, ice, snow, dirt, mud, air or other gases, or space in general.

As used herein, "operating environment" may refer broadly to roadways, highways, streets, paths, parking lots, parking structures, tunnels, bridges, traffic intersections, residential garages, or commercial garages. It is contemplated that the operating environment may include any location or space accessible by a vehicle.

As used herein, "computing device" or "computer" may refer broadly to a system constructed and arranged to execute the processes and steps described in this disclosure. A computer device may include one or more processors in operable communication with memory through a system bus that couples various system components such as input/output (I/O) devices. Processors suitable for the execution of computer readable program instructions or processes may include both general and special purpose microprocessors and any one or more processors of any digital computing device. A computing device may include standalone computer or mobile computing device, a smart device, a mainframe computer system, a workstation, a network computer, a desktop computer, a laptop, or the like. A computing device maybe a combination of components including a processor, memory, data storage, and the like in operable communication with a variety of systems within a vehicle such as, but not limited to, electronic steering systems, traction control systems, autonomous and semi-autonomous driving systems, or the like.

In a number of illustrative variations, slip control systems such as but not limited to a traction control system (TCS) or engine stability control (ESC) may be used to prevent a vehicle's wheels from spinning, due to a low surface friction coefficient, when torque is delivered to the wheels. Slip control systems may therefore be used to promote vehicle stability by selectively delivering power to the wheels based upon sensed slippage of the wheels, thus preventing unintended imbalances in driving force delivered from each wheel to the vehicle.

In a number of illustrative variations, slip control systems such as, but not limited to, anti-lock braking systems (ABS) may be user to prevent a vehicle's wheels from locking, due to a low surface friction coefficient, when braking. Electronic Braking Distribution (EBD) may also be used to adjust the bias between the rear brakes and front brakes or left brakes and right brakes. Slip control systems may therefore be used to promote maintained steering control by selectively braking the wheels based upon sensed slippage of the wheels, thus preventing unintended imbalance in braking force delivered from each wheel to the vehicle.

In a number of illustrative variations, a steering system may comprise an autonomous slip control system incorporating TCS, ESC, ABS, EBD, or the like. In such illustrative variations, the slip control system may be integrated into or communicate with the vehicle control systems of the autonomous steering system including but not limited to the propulsion systems including but not limited to engine control systems, braking control systems, and vehicle steering systems.

In a number of illustrative variations, the surface friction coefficient, which may also be called the coefficient of surface friction, surface adhesion coefficient, or surface friction factor may be used as a metric for the amount of force that may be transmitted between a driving surface and a wheel of a vehicle. The coefficient of friction, or mu value, may be estimated by the system via a plurality of sensors and systems constructed and arranged to continuously monitor road and vehicle conditions, in addition to receiving information from external sources, such that systems within a vehicle may compensate for estimated mu value and road surface classification.

A number of illustrative variations may include a method or product for accurate mu value estimation and generation for various road surfaces, operating environments, and driving scenarios by monitoring acoustic signals and vibration signatures. Acoustic signals and vibration signatures may be used to perform feature extraction signal processing techniques such as, but not limited to, utilizing Mel filter banks for acoustic signals or continuous wavelet transform (CWT) for vibration signals. Acoustic signals and vibration signatures may be further processed and transformed via a pre-trained machine learning model or neural network to generate estimated mu values. Estimated mu values may be communicated to vehicle systems, such as slip control systems, to compensate for variations in mu values or road surface classifications.

A system for mu value estimation may include monitoring or recording acoustics signals by at least one microphone disposed approximately within a wheel well of a vehicle or other suitable locations suitable for measuring sounds pressure. The system may incorporate various other data sets from various other sources such as tire-pressure monitoring systems (TPMS), road surface data, GPS position data, weather data, and the like. It is contemplated that other products and methods for mu estimation fall within the scope of this disclosure and the variations described herein, including at least one microphone, shall not be considered limiting with respect to how sound pressure is measured. The system may aggregate data such as accelerometer-based vibration signals, acoustic pressure signals, TPMS data, and the like to process the various signals and data which may be fed to a pre-trained machine learning model to generate a mu value for a road surface in a particular driving scenario.

The system for mu value estimation may include at least one accelerometer positioned approximately near the steering knuckle or alternatively near, or as a part of, a tire-pressure sensor may monitor or record vibration signatures in the wheel, steering assembly, or various other parts and portions of a vehicle. It is contemplated that other products and methods for mu estimation fall within the scope of this disclosure and the variations described herein, including the use of accelerometers, shall not be considered limiting with respect to how vibration signature is measured, monitored, or recorded.

At least one microphone may be in operable communication with at least one computing device constructed and arranged to receive acoustic signals observed by the at least one microphone. The at least one accelerometer may also be in operable communication with the at least one computing device, the at least one computing device being constructed and arranged to receive vibration signatures monitored or recorded by the at least one accelerometer.

The system for vibration-based mu estimation and detection may further include a contact sensor system constructed and arranged to detect and classify varying sound signals such as low-speed impacts.

The system for vibration-based mu estimation and detection may be in operable communication with a network such as a vehicle-to-everything (V2X) network such that the system may receive road data including road surface information, GPS vehicle position data, weather and climate data, and various other information. Externally sourced data received by the system may be used to determine road surface classification in addition to generating a mu value.

The system may further account for various factors such as inflation within the tires of a vehicle, snow or dirt packing within the wheel wells of a vehicle, varying tire types such as summer, winter, all season, etc. such that the generated mu value may be continuously tuned based on a vehicle's particular response within a given driving situation where differing move performance is detected.

The system for mu value estimation may receive the aforementioned datasets and perform feature extraction signal processing techniques such as utilizing Mel filter banks for acoustic signals or continuous wavelet transforms for vibration signals such that the processed data sets may be fed to a pre-trained machine learning module constructed and arranged to generate a mu value. Feature extraction and computation of mu values may occur locally within a computing device within a vehicle or may occur via the V2X network on a cloud-based computing system. The machine learning module may classify road type and generate a mu value using regression-based neural networks and may be constructed and arranged to reduce noise in dataset by identifying unique feature variations. The pre-trained machine learning module may generate a road surface classification and mu estimation in addition to various other outputs such as tire wear warnings. Road surface classification and mu estimation may further be used to generate a qualified mu number based on chassis performance assessment. Additionally, the system may compare historical data based on GPS vehicle location, V2X data, and mu estimations to current GPS vehicle location, V2X data, and mu estimations to continually tune value thresholds for mu estimation.

The system for mu value estimation may collect data from test vehicles where a fleet of test vehicles with known combinations of tire and chassis arrangements may be operating in a test fleet and data may be collected via a plurality of sensors in each vehicle of the test fleet. Collected data may be uploaded to a central server where the data may be matched with the known mu values for the known combinations of tire and chassis arrangements for each individual vehicle. Matched data may be fed to a machine learning model using the transformation such as, but not limited, feature extraction via Mel filter banks or continuous wavelet transforms0 in addition to other feature extraction methods. The machine learning model may then be trained to generate outputs as per the training data and tested using new available previously unseen data. This data may include accelerometer-based vibration signals, acoustic pressure signals, TPMS data, road surface information, GPS vehicle position data, and weather and climate data which will be available during normal operations of the vehicle in the field.

Data sets may further be manipulated to generate a confidence number associated with accelerometer-based vibration signals, acoustic pressure signals, TPMS data, road surface information, GPS vehicle position data, and weather and climate data.

A number of variations may include a vehicle comprising a body mounted air brake for stabilizing and steering a vehicle having autonomous driving capabilities or functions, wherein the air brake is power actuated. The autonomous driving functions will have pre-determined information pre-programmed. This information will detail how much lateral forces can be generated by each of the control surfaces (air brakes) for various vehicle speeds and attack angles. This information will be used by the autonomous motion control system to determine whether (based on current determination of surface mu) an additional force is required beyond what traditional lateral force providers (differential braking/ steering) can provide). The system will then deploy the appropriate air brake at an appropriate attack angle.

A number of variations may include a vehicle have a body comprising at least one of a drive side, passenger side, a front-end, a rear-end, a hood, a roof, or a truck lid, at least one body mounted power actuated air brake constructed and arranged to be actuated to stabilize or steer the vehicle, wherein the vehicle is constructed and arranged to drive using at least an autonomous driving mode. The shape of the air brake might be simple flat surface that matches with vehicle's external shape or might be of other shapes such as a conical surface where the incoming air force is concentrated at the center of the cone. Similarly, the air brakes might deploy in ways to either add force on one side of the plane or deploy in a way to reduce drag on one side of the vehicle.

The above description of select variations within the scope of the invention is merely illustrative in nature and, thus, variations or variants thereof are not to be regarded as a departure from the spirit and scope of the invention.

What is claimed is:

1. A vehicle comprising:
a body mounted air brake for stabilizing and steering a vehicle, wherein the air brake is power actuated;
a processor;
a memory storing instructions executable by the processor to provide autonomous driving functions of the vehicle, the memory including information regarding lateral forces generated by the body mounted air brake for various vehicle speeds, the instructions executable by the processor to cause an autonomous motion control system to determine whether, based on a surface coefficient of friction, to control the autonomous motion control system to deploy the body mounted air brake;
a body comprising at least one of a drive side, passenger side, a front-end, a rear-end, a hood, a roof, or a truck lid; and
at least one body mounted power actuated air brake constructed and arranged to be actuated to stabilize or steer the vehicle,
wherein the vehicle is constructed and arranged to drive using at least an autonomous driving mode,
wherein the shape of the at least one body mounted power actuated air brake is a flat surface that matches with an external shape of the vehicle or other shape including a conical surface configured to force incoming air force to be concentrated at the center of the conical surface,
wherein the at least one body mounted power actuated air brake is deployable to either add force on one side of a central, longitudinal plane of the vehicle or deployable to reduce drag on one side of the vehicle
wherein the at least one body mounted power actuated air brake comprises at least four actuators pivotally connected to an air brake panel; and
wherein the at least one body mounted power actuated air brake is constructed and arranged to tilt in X, Y, and Z directions.

2. The vehicle as set forth in claim 1, wherein the at least one body mounted power actuated air brake comprises a pair of body mounted power actuated air brakes separated by a vertical, central plane running lengthwise of the vehicle, the pair of power actuated air brakes mounted on the body and constructed and arranged to be actuated to stabilize or steer the vehicle, and
wherein the vehicle is constructed and arranged to drive using at least an autonomous driving mode.

3. The vehicle as set forth in claim 2, wherein a first body mounted power actuated air brake of the pair of body mounted power actuated air brakes is mounted on a portion of the body comprising a driver side front quarter panel, a driver side front door panel, a driver side rear door panel, a drive side rear quarter panel, a passenger side front quarter panel, a passenger side front door panel, a passenger side rear door panel, and a passenger side rear quarter panel, a hood, a roof, a trunk decklid, a front-end body panel, or a rear-end panel.

4. The vehicle as set forth in claim 2, wherein the pair of body mounted power actuated air brakes is symmetrically positioned with respect to the vertical, central plane running lengthwise of the vehicle.

5. A system comprising:
a vehicle having at least one sensor of optical recognition device,
at least one power actuatable air brake mounted on a panel of the vehicle,
at least one processor, memory, and instructions stored in the memory and executable by the processor to receive input from the at least one sensor of optical recognition device, use the input received from the at least one sensor of optical recognition device to estimate a coefficient of friction of the driving surface on which the vehicle is travelling and determine that the estimated a coefficient of friction is below a predetermined value or to recognize the presence a material including at least one of ice, snow, standing water, gravel, sand, dirt, or loose asphalt on the driving surface on which the vehicle is traveling, activate the at least one power actuatable air brake in response to the determination that the estimated coefficient of friction is below the predetermined value or the recognition of the presence of the material to stabilized or steer the vehicle; and
at least four actuators pivotally connected to the air brake to tilt the at least one body mounted power actuated air brake in X, Y, and Z directions.

6. The system as set forth in claim 5, further comprising at least one vehicle dynamics sensor,
wherein the instructions executable by the processor cause processor to receive input from the at least one vehicle dynamics sensor and determine pitch, roll, or yaw of the vehicle, and to activate, deactivate or adjust a position of the at least one power actuatable air brake and the drag aerodynamic drag caused the vehicle by the at least one power actuatable air brake in response to the determined pitch, roll, or yaw of the vehicle.

7. A method for use in a vehicle having at least one sensor or optical recognition device, at least one power actuatable air brake mounted on a panel of the vehicle, at least one processor, memory, and instructions stored in the memory and executable by the processor, the method comprising:

the processor receiving input from the at least one sensor or optical recognition device, using the input received from the at least one sensor or optical recognition device to estimate a coefficient of friction of the driving surface on which the vehicle is travelling and determine that the estimated a coefficient of friction is below a predetermined value or to recognize the presence a material including at least one of ice, snow, standing water, gravel, sand, dirt, or loose asphalt on the driving surface on which the vehicle is traveling, determining tilt of the at least one body mounted power actuated air brake in X, Y, and Z directions based on the sensor data, activating the at least one power actuated air brake in response to the determination that the estimated coefficient of friction is below the predetermined value or the recognition of the presence of the material to stabilized or steer the vehicle.

8. The method as set forth in claim 7, wherein the vehicle includes at least one vehicle dynamics sensor, and wherein the method further comprises the processor receiving input from the at least one vehicle dynamics sensor and determining the pitch, roll, or yaw of the vehicle, and activating, deactivating, or adjusting the position of the power actuated air brake and the aerodynamic drag caused on the vehicle by the actuated air brake in response to the determined pitch, roll, or yaw of the vehicle.

9. A vehicle comprising:

a body mounted air brake for stabilizing and steering the vehicle, the vehicle having autonomous driving capabilities or functions, wherein the body mounted air brake is power actuated;

wherein the at least one body mounted power actuated air brake is deployable to either add force on one side of a central, longitudinal plane of the vehicle or deployable to reduce drag on one side of the vehicle;

wherein the at least one body mounted power actuated air brake comprises at least four actuators pivotally connected to an air brake panel; and wherein the at least one body mounted power actuated air brake is constructed and arranged to tilt in X, Y and Z directions.

10. A vehicle comprising:

a body comprising at least one of a drive side, passenger side, a front-end, a rear-end, a hood, a roof, or a truck lid; and at least one body mounted power actuated air brake constructed and arranged to be actuated to stabilize or steer the vehicle, wherein the at least one body mounted power actuated air brake is deployable to either add force on one side of a central, longitudinal plane of the vehicle or deployable to reduce drag on one side of the vehicle wherein the at least one body mounted power actuated air brake comprises at least four actuators pivotally connected to an air brake panel;

wherein the at least one body mounted power actuated air brake is constructed and arranged to tilt in X, Y, and Z directions; and wherein the vehicle is constructed and arranged to drive using at least an autonomous driving mode.

* * * * *